United States Patent
Putman et al.

(10) Patent No.: US 11,409,367 B2
(45) Date of Patent: Aug. 9, 2022

(54) APPARATUS AND METHOD FOR MANIPULATING OBJECTS WITH GESTURE CONTROLS

(71) Applicant: Nanotronics Imaging, Inc., Cuyahoga Falls, OH (US)

(72) Inventors: Matthew C. Putman, Brooklyn, NY (US); John B. Putman, Celebration, FL (US); Paul Roossin, New York, NY (US)

(73) Assignee: Nanotronics Imaging, Inc., Cuyahoga Falls, OH (US)

(*) Notice: Subject to any disclaimer, the term of this patent is extended or adjusted under 35 U.S.C. 154(b) by 0 days.

(21) Appl. No.: 17/155,645

(22) Filed: Jan. 22, 2021

(65) Prior Publication Data

US 2021/0141463 A1 May 13, 2021

Related U.S. Application Data

(63) Continuation of application No. 16/904,830, filed on Jun. 18, 2020, now Pat. No. 10,901,521, which is a continuation of application No. 15/113,590, filed as application No. PCT/US2015/014036 on Feb. 2, 2015, now Pat. No. 10,691,215.

(60) Provisional application No. 61/933,995, filed on Jan. 31, 2014.

(51) Int. Cl.
*G06F 3/01* (2006.01)
(52) U.S. Cl.
CPC ...... *G06F 3/017* (2013.01); *G06F 2203/0382* (2013.01)

(58) Field of Classification Search
CPC .................... G06F 3/017; G06F 2203/0382
See application file for complete search history.

(56) References Cited

U.S. PATENT DOCUMENTS

| | | |
|---|---|---|
| 4,349,708 A | 9/1982 | Asher |
| 8,106,749 B2 | 1/2012 | Ina et al. |
| 8,316,324 B2 | 11/2012 | Boillot |
| 8,612,043 B2 | 12/2013 | Moyne et al. |
| 8,909,926 B2 | 12/2014 | Brandt et al. |
| 9,672,627 B1* | 6/2017 | Ramaswamy ........ G06T 7/292 |
| 2005/0212753 A1 | 9/2005 | Marvit et al. |
| 2009/0217211 A1 | 8/2009 | Hildreth et al. |

(Continued)

FOREIGN PATENT DOCUMENTS

DE 102012220195 5/2014

*Primary Examiner* — Mark Edwards
*Assistant Examiner* — Chayce R Bibbee
(74) *Attorney, Agent, or Firm* — DLA Piper LLP (US)

(57) ABSTRACT

An apparatus for manipulating an object includes first and second gesture controllers, each operatively connected to the object and structured and programmed such that, in a first-action active state, each can causes a first action to be carried out on the object by an appropriate first-action gesture made in the gesture controller. Only one of the first and second gesture controllers at any given time is capable of being in the first-action active state, and the first-action active state is transferable between the first and second gesture controllers upon the detecting of a first-action transfer gesture by one of said first gesture controller and said second gesture controller. Specific gesture control apparatus and methods for manipulating an object are also disclosed.

20 Claims, 6 Drawing Sheets

(56) References Cited

U.S. PATENT DOCUMENTS

| | | | |
|---|---|---|---|
| 2013/0120249 A1* | 5/2013 | Im | G06F 3/011 |
| | | | 345/157 |
| 2013/0182902 A1 | 7/2013 | Holz | |
| 2013/0211592 A1* | 8/2013 | Kim | G06F 3/017 |
| | | | 700/258 |
| 2014/0124647 A1* | 5/2014 | Hsu | G06F 1/3262 |
| | | | 250/206.1 |
| 2014/0157209 A1* | 6/2014 | Dalal | G06K 9/00355 |
| | | | 715/863 |
| 2014/0232635 A1* | 8/2014 | Lee | G06F 3/0346 |
| | | | 345/156 |
| 2016/0320860 A1 | 11/2016 | Josephson | |
| 2020/0326785 A1 | 10/2020 | Putman et al. | |

* cited by examiner

APPARATUS AND METHOD FOR MANIPULATING OBJECTS WITH GESTURE CONTROLS

CROSS-REFERENCE TO RELATED APPLICATIONS

This application is a continuation of U.S. patent application Ser. No. 16/904,830, filed Jun. 18, 2020, which is a continuation of U.S. patent application Ser. No. 15/113,590, filed Jul. 22, 2016, now U.S. Pat. No. 10,691,215, issued Jun. 23, 2020, which is a National Stage of PCT/US2015/014036, filed Feb. 2, 2015, which claims the benefit of U.S. Provisional Patent Application No. 61/933,995, filed Jan. 31, 2014, which are incorporated by reference in their entireties.

FIELD OF THE INVENTION

The present relates to apparatus and methods for manipulating objects, whether virtual or physical, through the use of gestures made in the sensing fields of gesture controllers. In some embodiments, this invention relates to apparatus and methods for facilitating control and manipulation of objects using multiple gesture controllers. In some embodiments, this invention relates to allowing multiple operators to manipulate multiple objects using gestures with the operators having non-conflicting control of said objects.

BACKGROUND OF THE INVENTION

In the 1970's computer motion control became consumer practical because of the advance of micro processing and decrease of price. The joystick developed by Atari described in U.S. Pat. No. 4,349,708 could be used to control the movement of computer generated object on a computer monitor. A typical use for joysticks involves two operators playing a video game displayed on a monitor, each operator using its own joystick to move objects and on the computer monitor. The joysticks are connected to a computer, including, among other components, a processor, dynamic and static memory, an operating system, and necessary software programming to interpret the movement of the joystick to control the motion of objects on the computer monitor. Such computer generated objects can be considered "virtual" objects herein. Other devices for motion control of virtual objects include track balls, computer mouses, trackpads and the computer keyboard. In all of these controllers, the user is in intimate physical contact with the controller during its use. Use of such controllers has not been limited to controlling virtual objects. They are also used to move physical objects. Joysticks are used to control objects such as wheel chairs, industrial cranes and equipment among others.

Computer keyboards, track balls and joysticks require an operator to manipulate a physical control device to move a virtual object or physical object. Gesture or touchless control allows an operator to interact with a virtual object or physical object without coming into contact with a control device. Gesture control of virtual and physical objects is the subject of much research and development. Theses gesture controlled systems are gaining in popularity and it is believed will soon be ubiquitous in many industries and even in areas of domestic life. Already gesture control is employed in "smart" televisions and gaming systems (such as Microsoft's Kinect™ system). U.S. Pat. Nos. 8,106,749 and 8,316,324 describe gesture control of objects. Companies such as Leap Motion, Inc. (USA), Pointgrab Ltd. (Israel), zSpace, Inc. (USA), and Microsoft Corporation (USA) have developed gesture control software and hardware. Leap Motion's U.S. Patent Application 2013/0182902 describes capturing motion in 3 dimensional space. The system described is merely an example of a type of gesture controller, and the present invention is independent of the method used to detect any motion control. The present disclosure does not seek to develop methodology for the recognition of gestures and the conversion of those gestures to manipulations of virtual objects or physical objects. Instead, in some embodiments, the present disclosure advances the art by acknowledging the need for and providing apparatus and methods implementing safety measures when manipulating an object through the use of multiple gesture controllers. In other embodiments, the present disclosure provides novel apparatus and methodologies for manipulation of virtual objects or physical objects through gesture controllers. The 3D space will be referred to as the sensing field.

SUMMARY OF THE INVENTION

In a first embodiment, the present invention provides a gesture controlled system for manipulating an object comprising: a first gesture controller operatively connected to the object and structured and programed such that, in a first-action active state, it causes a first action to be carried out on the object after detecting a first-action gesture associated with said first gesture controller, a second gesture controller operatively connected to the object and structured and programed such that, in a first-action active state, it causes said first action to be carried out on the object after detecting a first-action gesture associated with said second gesture controller, wherein said first-action gesture associated with said first gesture controller may be the same as or different from said first-action gesture associated with said second gesture controller, wherein only one of said first and second gesture controllers at any given time is capable of being in said first-action active state, and wherein said first-action active state is transferable between said first and second gesture controllers upon the detecting of a first-action transfer gesture by one of said first gesture controller and said second gesture controller.

In a second embodiment, the present invention provides a gesture controlled system as in the first embodiment, wherein said first-action transfer gesture is a pass gesture, and said first-action active state is transferable from said first gesture controller to said second gesture controller when said pass gesture is detected by said first gesture controller, and wherein said first gesture controller is placed in a first-action inactive state and cannot cause said first action to be carried out on the object.

In a third embodiment, the present invention provides a gesture controlled system as in either the first or second embodiment, wherein said first gesture controller must be in a pass active state for said first-action active state to be transferable upon detection of said pass gesture.

In a fourth embodiment, the present invention provides a gesture controlled system as in any of the first through third embodiments, wherein said first-action transfer gesture is a pass gesture, and said first-action active state is transferable from said second gesture controller to said first gesture controller when said pass gesture is detected by said second gesture controller, and wherein the second gesture controller is placed in a first-action inactive state and cannot cause said first action to be carried out on the object.

In a fifth embodiment, the present invention provides a gesture controlled system as in any of the first through fourth embodiments, wherein said first-action transfer gesture is an acquire gesture, and said first-action active state is transferable from said first gesture controller to said second gesture controller when an acquire gesture is detected by said second gesture controller, and wherein the first gesture controller is placed in a first-action inactive state and cannot cause said first action to be carried out on the object.

In a sixth embodiment, the present invention provides a gesture controlled system as in any of the first through fifth embodiments, wherein said second gesture controller must be in an acquire gesture active state for said first-action active state to be transferrable upon detection of said acquire gesture.

In a seventh embodiment, the present invention provides a gesture controlled system as in any of the first through sixth embodiments, wherein said first-action transfer gesture is an acquire gesture, and said first-action active state is transferable from said second gesture controller to said first gesture controller when said acquire gesture is detected by said first gesture controller, and wherein the second gesture controller is placed in a second-action inactive state and cannot cause said first action to be carried out on the object.

In an eighth embodiment, the present invention provides a gesture controlled system as in any of the first through seventh embodiments, wherein the object is a virtual object or a physical object.

In a ninth embodiment, the present invention provides a gesture controlled system as in any of the first through eighth embodiments, wherein said first gesture controller is structured and programed such that, in a second-action active state, it causes a second action to be carried out on the object after detecting a second-action gesture associated with said first gesture controller, and wherein said second gesture controller, in a second-action active state, causes said second action to be carried out on the object after detecting a second-action gesture associated with said second gesture controller, wherein said second-action gesture associated with said first gesture controller may be the same as or different from said second-action gesture associated with said second gesture controller, wherein only one of said first and second gesture controllers at any given time is capable of being in said second-action active state, and wherein said second-action active state is transferable between said first and second gesture upon the detecting of a second-action transfer gesture by one of said first gesture controller and said second gesture controller.

In a tenth embodiment, the present invention provides a gesture controlled system as in any of the first through ninth embodiments, wherein said second-action active state is transferable from said first gesture controller to said second gesture controller when a second-action transfer gesture is detected by said first gesture controller, and wherein the first gesture controller is placed in a first-action inactive state and cannot cause said first action to be carried out on the object.

In an eleventh embodiment, the present invention provides a gesture controlled system as in any of the first through tenth embodiments, wherein said second-action active state is transferable from said second gesture controller to said first gesture controller when a second-action transfer gesture is detected by said second gesture controller, and wherein the second gesture controller is placed in a first-action inactive state and cannot cause said first action to be carried out on the object.

In a twelfth embodiment, the present invention provides a gesture controlled system as in any of the first through eleventh embodiments, further comprising said second-action active state is transferable from said first gesture controller to said second gesture controller when a second-action transfer gesture is detected by said second gesture controller, and wherein the first gesture controller is placed in a first-action inactive state and cannot cause said first action to be carried out on the object.

In a thirteenth embodiment, the present invention provides a gesture controlled system as in any of the first through twelfth embodiments, wherein said second-action active state is transferable from said second gesture controller to said first gesture controller when a second-action transfer gesture is detected by said first gesture controller, and wherein the second gesture controller is placed in a second-action inactive state and cannot cause said first action to be carried out on the object.

In a fourteenth embodiment, the present invention provides a gesture controlled system as in any of the first through thirteenth embodiments, wherein, when said first gesture controller is in said first-action active state, and a first-action pause gesture is detected by said first gesture controller, said first gesture controller is placed in a first-action inactive state in which said first gesture controller is unable to cause said first action to be carried out on the object, and said second gesture controller is placed in a first-action inactive state in which said second gesture controller is unable to cause said first action to be carried out on the object.

In a fifteenth embodiment, the present invention provides a gesture controlled system as in any of the first through fourteenth embodiments, wherein, when said second gesture controller is in said first-action active state, and a first-action pause gesture is detected by said second gesture controller, said first gesture controller is placed in a first-action inactive state in which said first gesture controller is unable to cause said first action to be carried out on the object, and said second gesture controller is placed in a first-action inactive state in which said second gesture controller is unable to cause said first action to be carried out on the object.

In a sixteenth embodiment, the present invention provides a gesture controlled system as in any of the first through fifteenth embodiments, wherein said first gesture controller has a sensing field and a sensor that detects gestures made within said sensing field, and wherein said first-action pause gesture is removing an gesturing object from a sensing area of said first gesture controller.

In a seventeenth embodiment, the present invention provides a gesture controlled system as in any of the first through sixteenth embodiments, wherein said first gesture controller has a sensing field and a sensor that detects gestures made within said sensing field, and wherein said first-action transfer gesture is removing a gesturing object from a sensing area of one of said first gesture controller and said second gesture controller.

In an eighteenth embodiment, the present invention provides a gesture controlled system as in any of the first through seventeenth embodiments, wherein said first gesture controller has a sensing field and a sensor that detects gestures made within said sensing field.

In a nineteenth embodiment, the present invention provides a gesture controlled system as in any of the first through eighteenth embodiments, wherein apparatus operatively communicates between the object and the sensor to cause actions taken on the object based on gestures detected by said sensor.

In a twentieth embodiment, the present invention provides a gesture controlled system as in any of the first through nineteenth embodiments, wherein the object is virtual object.

In a twenty-first embodiment, the present invention provides a gesture controlled system as in any of the first through twentieth embodiments, wherein the object is a physical object.

In a twenty-second embodiment, the present invention provides a gesture controlled system as in any of the first through twenty-first embodiments, wherein the first gesture controller is structured and programed such that the object is moved upon a movement of a gesturing object in the gesture controller relative to a home position, and wherein a new home position is established in the gesture controller when a home gesture is detected by the gesture controller.

In a twenty-third embodiment, the present invention provides a gesture controlled system for manipulating an object comprising: a plurality of gesture controllers interpreting a plurality of gestures to cause a plurality of actions to be carried out on the object, each of said plurality of actions being associated with a particular one of said plurality of gestures; wherein two or more of said plurality of gesture controllers can cause a particular one of said plurality of actions if in an active state for carrying out that action; wherein, at any given time, only one of said two or more of said plurality of gesture controllers is capable of being in said active state; and wherein said active state is transferable between said two or more of said plurality of gesture controllers upon the detection of a transfer gesture in one of said two or more of said plurality of gesture controllers. This embodiment can also be implemented in any of the forgoing embodiments.

In a twenty-fourth embodiment, the present invention provides a method for manipulating an object comprising: providing a first gesture controller operatively connected to the object and structured and programed such that, in a first-action active state, it causes a first action to be carried out on the object after detecting a first-action gesture associated with said first gesture controller; providing a second gesture controller operatively connected to the object and structured and programed such that, in a first-action active state, it causes said first action to be carried out on the object after detecting a first-action gesture associated with said second gesture controller, wherein said first-action gesture associated with said first gesture controller may be the same as or different from said first-action gesture associated with said second gesture controller, wherein only one of said first and second gesture controllers at any given time is capable of being in said first-action active state; and transferring said first-action active state between said first and second gesture controllers by making a transfer gesture detected by one of said first gesture controller and said second gesture controllers. This embodiment can also be implemented in any of the forgoing embodiments.

In a twenty-fifth embodiment, the present invention provides a gesture controlled system for manipulating an object comprising: a gesture controller operatively connected to the object and structured and programed such that the object is manipulated upon a movement of a gesturing object in the gesture controller relative to a home position, and wherein a new home position is established in the gesture controller when a home gesture is detected by the gesture controller. This embodiment can also be implemented in any of the forgoing embodiments.

In a twenty-sixth embodiment, the present invention provides a gesture controlled system for manipulating an object comprising: a gesture controller having a sensing field defined by at least one boundary, said gesture controller operatively connected to the object and structured and programed such that the object is manipulated upon a movement of a gesturing object in said sensing field, and when a gesturing object within the sensing field touches upon or leaves a boundary of the sensing field the action being performed is stopped. This embodiment can also be implemented in any of the forgoing embodiments.

DETAILED DESCRIPTION OF ILLUSTRATIVE EMBODIMENTS

Figure 1:
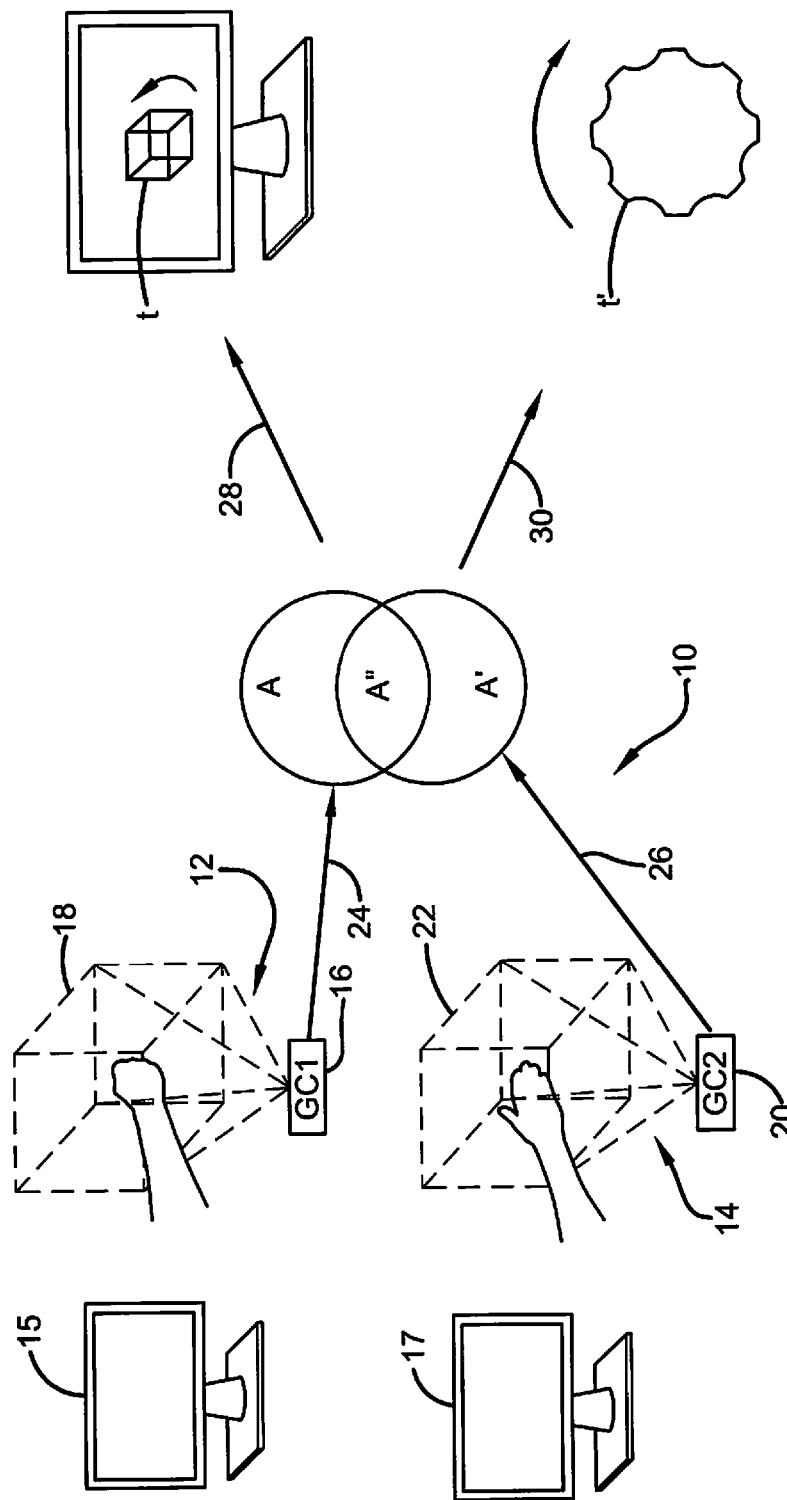
FIG. 1 is a general schematic view of aspects of the process and apparatus employed in the present invention.

The present invention teaches novel ways to structure systems that employ multiple gesture controllers to manipulate an object, whether that object be virtual or physical. With reference to FIG. 1, the system of this invention for manipulating an object through the use of gesture controllers is shown and designated by the numeral 10. The system 10 includes a plurality of gesture controllers, here shown as first gesture controller 12 and second gesture controller 14. Any number of gesture controllers may be employed. The disclosure of two gesture controllers is sufficient for disclosing the concepts of this invention, but all disclosures relating to the two gesture controllers can be applicable to third and fourth etc., gesture controllers. In some embodiments, the gesture controller 12 includes a sensor 16 that produces a sensing field 18, which is represented by a box defined by various planes. Similarly, the second gesture controller 14 includes a sensor 20 defining a sensing field 22 defined by planes. Gestures made within the sensing fields cause certain actions. Although a hand is shown as the item forming the gesture, any appendage or body part or even other physical devices, machines or robots might be employed to execute the gestures necessary to cause desired actions (broadly the gesture is made by a "gesturing object").

A "gesture" as used herein can include static and dynamic gestures. Static gestures would include making shapes or different signs with a gesturing device, often a hand or other appendage. Making an open hand, making a closed fist, making a one, two or three with the finger are all examples of static gestures. These are often useful for programmed actions. For example, make an open hand gesture could open the grip of a machine and making a closed first could close the grip. Dynamic gestures involve motion. For example, twisting the hand might result in a rotation of an object or 3D computer model thereof, with rotation dynamically following movement of the hand.

The gesture controllers are operatively connected to each other and to one or more objects for manipulating the objects. Computers and/or other processing units, herein "processors," interpret gestures and communicate with apparatus to cause the manipulation. The multiple gesture controllers need not be connected to a single computer but may be connected by the web, cloud, mobile device, etc. The present invention teaches that, at any given time, only one, non-conflicting command can be sent to the processors/apparatus that control particular manipulations of the object. These gesture controllers are shown simply for illustrative purposes and it should be appreciated that virtually any gesture control can be employed in the present system. There are a multitude of gesture controllers to choose from, including, without limitation, those described in U.S. Pat. Nos. 8,106,749, 8,316,324, and U.S. 2013/0182902. Gesture controllers are well known by those of skill in the art and even by the general public, for example, with such gesture control systems as that offered by Microsoft's Kinect™ system offered with its Xbox™ gaming systems.

The first gesture controller 12 and second gesture controller 14 are operatively connected by appropriate processors and/or apparatus to operate as disclosed herein, the communication being shown at arrow 13, and, in some embodiments, the state of various components and actions and other data relevant to the system 10 and its implementation to manipulate an object can be displayed at operator interface 15 associated with the first gesture controller 12 and operator interface 17 associated with the second gesture controller. To operatively connect the first gesture controller 12 to the desired object, the sensor 16 communicates with processors and/or apparatus, with the communication being represented by arrow 24 and the processors and/or apparatus being represented by apparatus A and apparatus A'. Sensor 20 communicates with processors and/or apparatus, with the communication being represented by arrow 26, and the processors and/or apparatus being represented by apparatus A' and apparatus A". In FIG. 1, the Venn diagram generally representing the various processors and/or apparatus as apparatus A, A' and A" is employed to show that sensors 16 and 20 can communicate with shared apparatus—as at apparatus A"—and can also communicate with their own unique apparatus as with apparatus A of sensor 16 and apparatus A' of sensor 20. The various apparatus A, A', and A" are operatively connected or communicate with either a virtual object t or a physical object t', as shown at arrows 28 and 30.

With respect to the first gesture controller 12, a gesture made in the sensing field 18 of sensor 16 is detected and processed to cause a particular action either between the multiple gesture controllers 12, 16 or on the virtual object t or physical object t'. With respect to the second gesture controller 14, a gesture made in the sensing field 22 of sensor 20 is detected and processed to cause a particular action either between the multiple gesture controllers 12, 16 or on an object t, t'. Some gestures will be interpreted to cause apparatus A or apparatus A" to effect manipulation of a virtual object t, in some embodiments, or a physical object t', in other embodiments. The present system 10 can be employed to manipulate virtual objects t, such as icons and/or images on a computer screen, or it can be employed to physically manipulate a physical object t'. Virtual objects could include computer-drafted images and 3D models, with a 3D model being represented in FIG. 1 by way of example. The 3d model is the cube shown on the computer screen. An exemplary action that could be carried out on such a 3D model is represented by the arrow on the computer screen showing that the image could be rotated perhaps by a gesture rotating the hand in either the first gesture controller 12 or the second gesture controller 14. A gear is employed to represent physical object t', but the physical items manipulated through the present system 10 are unlimited. The state of the art is such that gesture control will gain in popularity and increase in areas of application, and the present system is broadly applicable to any applications currently being investigated or hereafter developed.

With this general understanding of the system 10, the particular structure and programming of the plurality of gesture controllers in various embodiments is next disclosed. The disclosure focuses on the first gesture controller 12, being represented in flow charts by GC1. When necessary, the second gesture controller 14 is referenced as GC2. The flow charts also focus on particular broadly defined actions, but it will be appreciated that each gesture controller in the system can have any number of actions, each action relating to a specific gesture. In some embodiments, the present invention introduces novel safety measures by ensuring that actions shared by multiple gesture controllers can only be effected by one gesture controller at a time.

Figure 2:
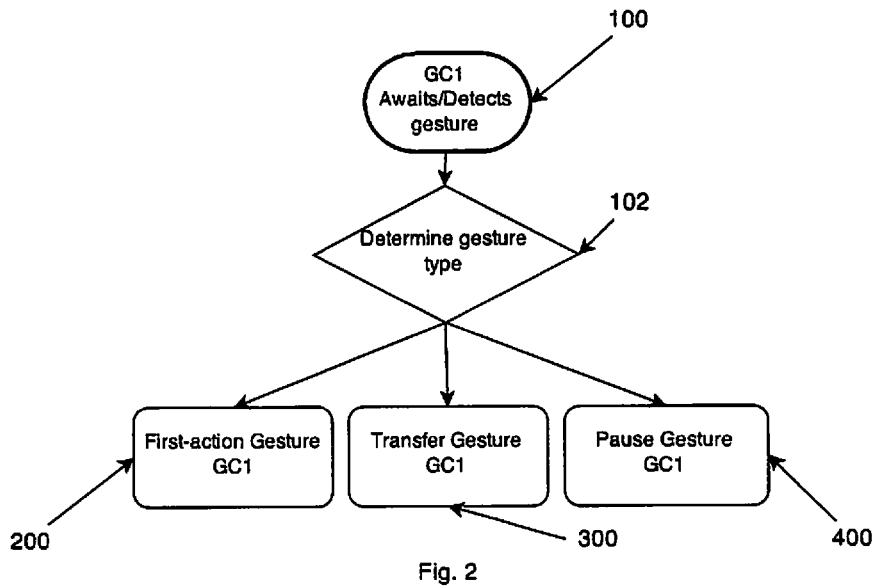
FIG. 2 is a flow chart of a portion of the process, showing a gesture controller detecting a particular type of gesture.

Referring now to FIG. 2, specific aspects of the first gesture controller are disclosed with the understanding that logic associated with the first gesture controller 12 (GC1) equally applies to the second gesture controller 14 (GC2). The first gesture controller 12 detects a gesture in its sensing field 18, as at step 100. Upon detection of a gesture, a processor associated with sensor 16 determines what type of gesture has been made in the sensing field 18, as shown at step 102. Determinations of this type and other determinations made per the disclosures herein are made by the processors and logic programmed into the system. Depending on the type of gesture made and other optional requirements, an appropriate desired action is carried out either between the first gesture controller 12 and one or more other gesture controllers (e.g. the second gesture controller 14) or on an object t, t'. The gestures relevant to the present invention and the manner in which they are treated by the system 10 are disclosed more fully in flow charts dealing with each particular gesture. In FIG. 2, the gestures relevant to the present invention are shown as a first-action gesture 200, a transfer gesture 300, and a pause gesture 400.

Through a first-action gesture 200, the object, whether virtual object t or physical object t', may be manipulated in a first type of way according to a gesture made in the sensing field. The term "first" is employed only to indicate the action is a distinct manipulation of the object t, t'. The gesture controllers 12, 14 and others when employed, can be programmed to recognize any number of second, third, etc. gestures and communicate with the apparatus A, A', A" so as to manipulate the object in second, third, etc ways. Through the transfer gesture 300, the ability to manipulate the object in a particular way through a given gesture, for example the first-action gesture 200, is transferred from one gesture controller to another. Through the pause gesture 400, the ability to manipulate the object in a particular way through a given gesture, for example the first-action gesture 200, is disabled in one or more gesture controllers. More particulars will be apparent from further disclosures below.

Figure 3:
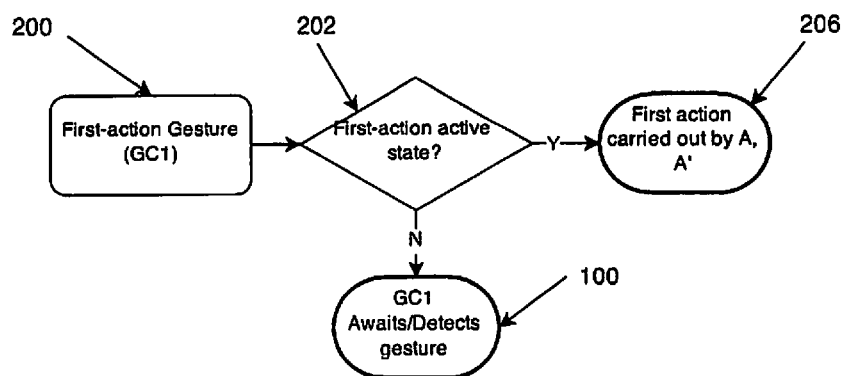
FIG. 3 is a flow chart of a portion of the process, showing the general logic followed by a controller for carrying out a particular action on the object.

Referring now to FIG. 3, the functioning of the first gesture controller 12 when detecting a first-action gesture 200 is disclosed. This disclosure applies equally well to any other gesture, broadly, second-action gestures, third-action gestures, etc., that are intended to result in manipulation of the object t, t'. Upon detection of a first-action gesture 200, a determination is made, as at 202, as to whether or not the first gesture controller 12 is in a first-action active state. If the first gesture controller is not in a first-action active state, the first gesture controller 12 cannot cause that first action to be carried out on the object t, t' through apparatus A or apparatus A", as represented at 100, wherein the controller simply awaits a gesture that it is able to execute. If the first gesture controller 12 is in a first-action active state, then the first gesture controller 12 can cause manipulation of the object t, t' through its communication with apparatus A or apparatus A", as shown at 206. In the case of a second gesture controller the manipulation can be achieved through apparatus A' or apparatus A". It will be appreciated that the same applies to the second gesture controller 14, and can apply to any number of gesture controllers employed. In the case of a second gesture controller the manipulation can be achieved through apparatus A' or apparatus A". Although focus has been drawn to a "first" action, it will be appreciated that any number of actions can be carried out through any number of gestures, with an active state particular to that gesture being necessary to result in the action being carried out. For example, a particular gesture might rotate an image on a screen or rotate a physical object, while another gesture might move an object on the screen to the right or move a physical object to the right.

In some embodiments, only one gesture controller can be in an active state for a given gesture resulting in a manipulation of the object t, t', i.e., for any given first-action gesture, second-action gesture, third-action gesture etc. at any given time. Thus, though multiple gesture controllers might be programmed similarly to carry out various actions, it is important in some embodiments, that two different gesture controllers cannot at the same time control a particular action. For instance, it may be important to ensure that a first operator of a first gesture controller 12 cannot attempt an action that conflicts with an action taken by an operator of a second gesture controller 14. This safety feature will be found very important as gesture controlled systems become more commonly implemented. Notably, for purposes of this invention, there may be certain actions that two or more controllers can carry out without being required to be in the active state. That is, there may be some manipulations of the object that are acceptable for always being controllable by two or more gesture controllers, for purposes of this invention, the system has at least one action that can only be carried out by one gesture controller at a time, thus requiring determination of an "active state" for the gesture that causes that action, as disclosed above. In some embodiments, every action might require an active state.

Figure 4:
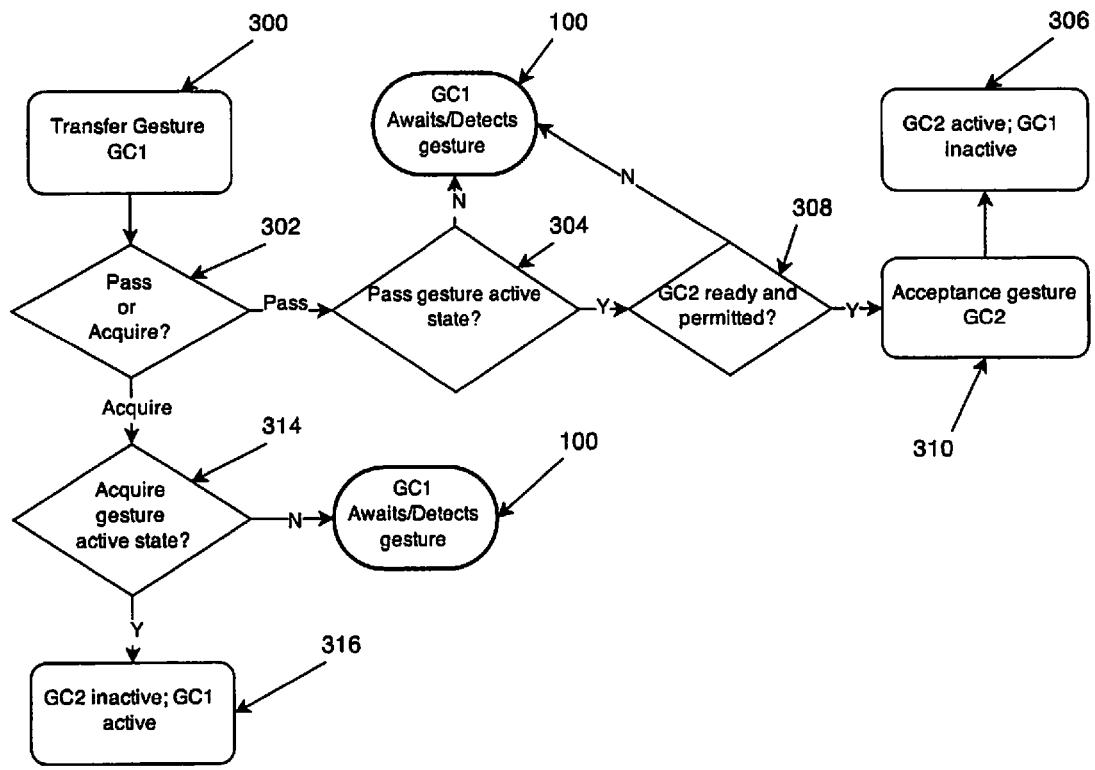
FIG. 4 is a flow chart of a portion of the process, showing the general logic for a controller transferring the ability to perform a particular action by either passing the ability to perform that action to another controller or taking the ability to perform that action from another controller.

Referring now to FIG. 4, the functioning of the first gesture controller 12 when detecting a transfer gesture 300 is disclosed. Some embodiments of the present invention employ a pass gesture, some embodiments employ an acquire gesture, and some embodiments employ both a pass gesture and an acquire gesture. Thus, at 302, it is first determined if the transfer gesture 300 is a pass gesture or an acquire gesture. The pass gesture is first addressed.

The pass gesture allows one to pass the active state for a given action to another controller. For example the first-action active state can be passed from a first gesture controller 12 to a second gesture controller 14. This ability might always be available, or, as shown in FIG. 4, at 304, the first gesture controller 12 might optionally have to be in a pass active state in order for a pass gesture to result in passing of the first-action active state to the second gesture controller 14 (or any other controller). If the first gesture controller 12 is not in a pass active state, the first gesture controller 12 causes no action and simply awaits detection of another gesture as at 100. If the first gesture controller 12 is in a pass active state for a first action, the first-action active state is passed to another controller, e.g., the second gesture controller 14 (GC2), as at 306. More particularly, the second gesture controller 14 is placed in the first-action active state, while, in some embodiments, the first gesture controller 12, which was just employed to pass the first-action active state to the second gesture controller 14 is placed in a first-action inactive state, wherein per FIG. 3, the first gesture controller 12 cannot cause the first action to be carried out on the object. Thus, it is possible for an operator of the first gesture controller to cause the first-action active state to be removed from the first gesture controller and passed to the second gesture controller by performing the pass gesture so as to be detected by the sensor 16. Only one operator at a time would be able to cause the first action to be carried out on the object.

The inactive state as discussed herein for various functions can be achieved in a number of ways, and the present invention is not limited to or by any particular apparatus or programming in this regard. The apparatus A, A', A" might remain engaged with the object t, t', but would not be able to receive commands from the gesture controller and related processors etc. to cause motion. Other methods to achieve the inactive state include disengaging the signal from the apparatus to the object, disengaging the signal from any processors to the apparatus, and disengaging the signal from the gesture controller sensor to a processor. Combinations of these methods may also be employed. Logic relays, solid state relays or other components not shown but commonly known must be added to the gesture controllers to permit the implementation of the inactive state.

In some embodiments, as shown at 308, a determination must first be made as to whether or not the second gesture controller 14 (GC2) is permitted to and is ready to accept the first-action active state being passed to that controller. If it is not permitted, the transfer will be denied. A notice could be made to the individual attempting the pass gesture, as, for example, at operator interface 15, shown as an informative screen in FIG. 1. If the second gesture controller 14 is not ready to accept the first-action active state, the transfer could be paused to allow time for the second gesture controller 14 to be ready, with the attempt to pass and the paused state being indicated at operator interface 17. In some embodiments, an acceptance gesture must be made within the sensing field of the controller to which the active state is being passed. This is shown at 310.

The acquire gesture is now addressed. The acquire gesture allows one to acquire the active state for a given action from another gesture controller. Here, a first-action gesture is the focus. This ability might always be available, or, as shown in FIG. 4, at 314, the first gesture controller 12 might optionally have to be in an acquire gesture active state in order for an acquire gesture to result in transfer of the first-action active state from another gesture controller to the first gesture controller 12. If the first gesture controller 12 is not in an acquire gesture active state the first gesture controller 12 causes no action and simply awaits detection of another gesture as at 100. In some embodiments, if the first gesture controller 12 is in an acquire gesture active state for a first action gesture, the first-action active state is transferred from whatever gesture controller or controllers are currently first-action active. Here the transfer is from the second gesture controller 14 (GC2), as at 316. In some embodiments, the active state subject to transfer can only exist for one gesture controller for a given action, and thus the performance of the acquire gesture simply transfers the active state from whatever gesture controller is active to the gesture controller in which the acquire gesture was made. More particularly, in the example shown, the first gesture controller 12 is placed in the first-action active state, while, the second gesture controller 14 is placed in a first-action inactive state, wherein per FIG. 3, the first gesture controller 12 cannot cause the first action to be carried out on the object. Thus, it is possible for an operator of the first gesture controller to cause the first-action active state to be removed from the second gesture controller and passed to the first gesture controller by performing the acquire gesture so as to be detected by the sensor 16. In this manner, only one operator at a time would be able to cause the first action to be carried out on the object.

The acquire gesture and its implementation can have wide application in education and training, allowing a mentor at one gesture controller to monitor the manipulation of the object as carried out by one or more trainees at separate and distinct gesture controllers. The mentor can take possession of certain actions if needed to assist in education or training or for safety reasons.

Figure 5:
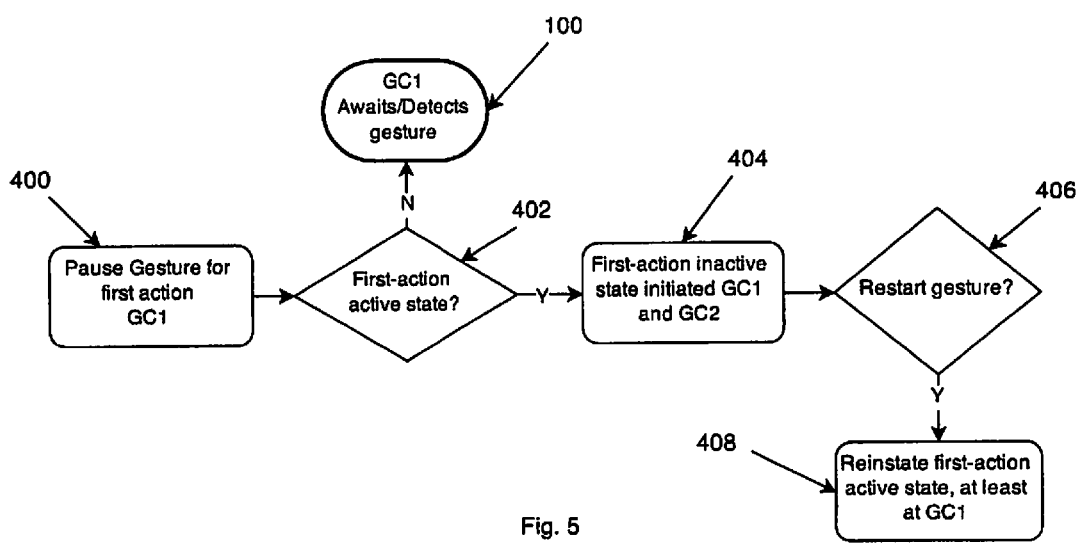
FIG. 5 is a flow chart of a portion of the process, showing the logic of a controller preventing one or more controllers from being able to perform a particular action or take the ability to perform a particular action from another controller.

Referring now to FIG. 5, the pause action 400 is disclosed. The pause gesture allows one to cause a certain action to be inactive for the system, until the action is reinstated as active on one or more controllers. For example the first-action active state can be made inactive for all gesture controllers. Explained in another way, a particular gesture can be made inoperable in the system 10 by placing all gesture controllers in an inactive state with respect to that gesture. In some embodiments, a given gesture controller might always have the ability to make a particular action inactive. In other embodiments, only a gesture controller that is in the active state for a specific gesture can successfully execute the pause gesture to place the system in the inactive state with respect to the execution of the action associated with that specific gesture. For the disclosure of this concept, the focus is on a first-action gesture and a first-action active state in FIG. 5.

As shown in FIG. 5, at 402, the first gesture controller 12 might optionally have to be in a first-action active state in order for a pause gesture to result in placing remaining controllers in a first-action inactive state. In some embodiments, if the first gesture controller 12 is not in a first-action active state, the first gesture controller 12 causes no action and simply awaits detection of another gesture as at 100. As at 404, if the first gesture controller 12 is in a first-action active state, the pause gesture results in both the first and second gesture controller 14 being placed in the first-action inactive state, whereby the first action gesture will be ineffective in both gesture controllers 12, 14. Thus, it is possible for an operator of a gesture controller to pause the ability to carry out a particular action.

In some embodiments, the paused action can be reinstated. In some embodiments, any gesture controller can be used to restart, while in other embodiments, only specifically dedicated gesture controllers can be used to restart. In specific embodiments, only the gesture controller that was employed to pause the action can be used to restart the action, i.e., the restart gesture must be made in the sensing field of the same gesture controller in which the pause gesture was made. As at 406, the first gesture controller 12 awaits a restart gesture for the first-action gesture. If the restart gesture is detected in the sensing field 18 of the first gesture controller 12, one or more gesture controllers are placed in the first-action active state, as at 408. In some embodiments, only the gesture controller in which the restart gesture is made is place in the active state.

Figure 6:
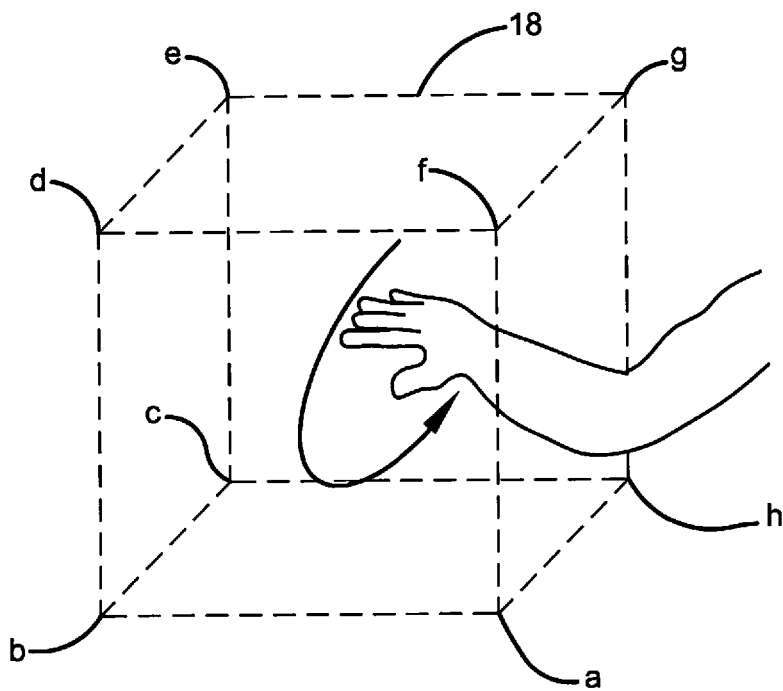
FIG. 6 is a general schematic showing, together with FIG. 7, the concept of a boundary switch, whereby particular actions are taken when a gesture is made touching upon or leaving the boundaries of the sensing field of a gesture controller.
Figure 7:
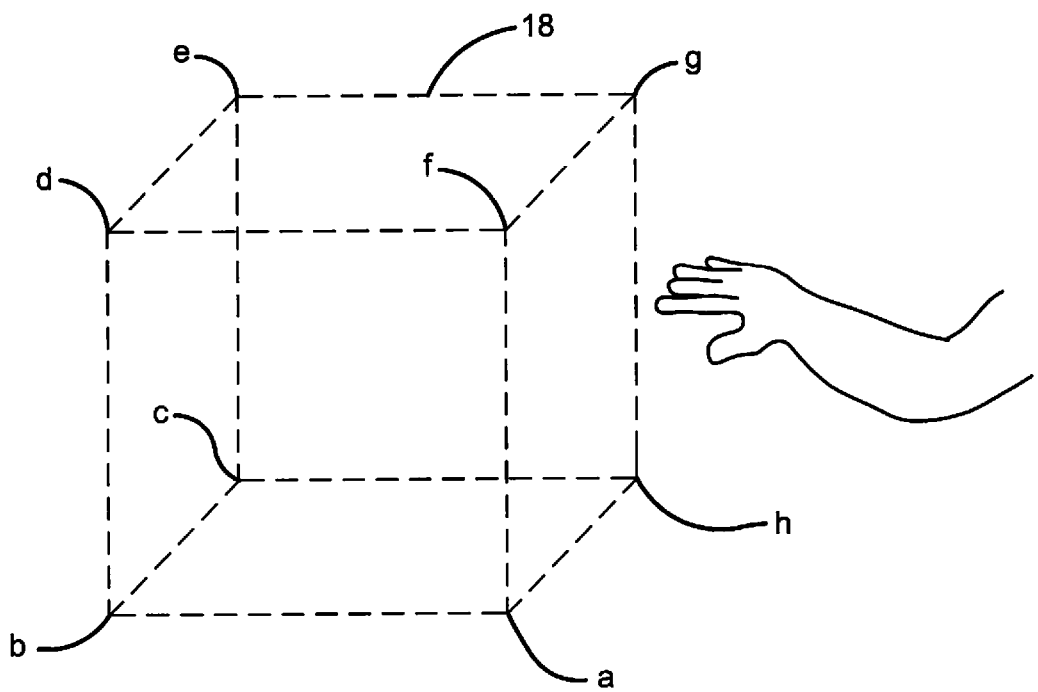
FIG. 7 is a general schematic showing, together with FIG. 6, the concept of a boundary switch, whereby particular actions are taken when a gesture is made touching upon or leaving the boundaries of the sensing field of a gesture controller.

Another embodiment of this invention provides safety measures and transfer gesture capabilities based on the sensing field dimensions. More particularly, removing a gesturing object from the boundaries of the sensing field can cause various desired actions. Herein, simply for convenience, reference will be made to a hand making gestures. With reference to FIGS. 6 and 7, it is seen that the sensing field 18 of the first gesture controller 12 is defined by the 4 boundary planes defined through points abd, points afg, points ceg, and cde. The top boundary may not be defined (or may be defined by the sensitivity of the sensor 16) whereas the bottom boundary is defined by the location of sensor 16. In this method, when the hand is removed from the sensing field 18, crossing a boundary plane, as in the condition of FIG. 7, certain actions are carried out.

In some embodiments, when a gesture is made touching upon or leaving the boundaries of the sensing field of a gesture controller the action being performed is stopped. For example if movement of the hand to the right within the sensing field causes movement of the object t, t' to the right, the hand touching upon or leaving the boundaries of the sensing field will result in a stopping of the object movement to the right. In some such embodiments, the gesture controller is placed in the inactive state with respect to a given action when a gesture is made touching upon or leaving the boundaries of the sensing field. In some embodiments, the gesture must fully leave the boundaries of the sensing field (in the example shown, the entire hand would have to leave the boundaries). For the purposes of this disclosure, the above concept will be referred to as a "boundary switch". Other ways may be possible to achieve a boundary switch but the concept of said switch is unique to the safe function of the invention.

In some embodiments, when the pause gesture disclosed above with respect to FIG. 5 includes one of either touching upon a boundary of the sensing field or fully removing an appendage (or other gesturing object) from a sensing field of a gesture controller. In some embodiments, the pause gesture is removing an appendage (or other gesturing object) from a sensing field.

In some embodiments, the pass gesture disclosed above with respect to FIG. 4 includes one of either touching upon a boundary of the sensing field or fully removing a gesturing object from a sensing field of a gesture controller. In some embodiments, the gesture must fully leave the boundaries of the sensing field. In some embodiment, the action taken depends upon the boundary touched or crossed. In some embodiments, a gesture touching upon or leaving the sensing field at a right-side boundary, such as boundary plane ceg of FIG. 6, causes a passing of an action to a specific gesture controller. This could be a gesture controller to the right of the gesture controller in which the pass gesture is taking place, thus providing an intuitive way in which to pass an action to another gesture controller. Similarly, in some embodiments, a gesture touching upon or leaving the sensing field at a left-side boundary, such as boundary plane abd of FIG. 6, causes a passing of an action to a specific gesture controller, which could be a gesture controller to the left of the gesture controller in which the pass gesture is taking place. In other embodiments, it is simply sufficient that the operator doing the passing knows one distinct gesture controller will pass the active state when a gesture is made across one boundary of the sensing field, and another separate and distinct gesture controller will be passed the active state when a gesture is made across a different boundary of the sensing field.

In one embodiment, a removal gesture across a right boundary causes a passing of the active state to a particular gesture controller, a removal gesture across a left boundary causes passing of the active state to a separate and distinct gesture controller, and removal across the near boundary (e.g., boundary plane afg) causes the gesture-based action being performed to stop.

In other embodiments, any boundary (not just the near boundary) could be used to cause the stop a desired action being performed.

Figure 8:
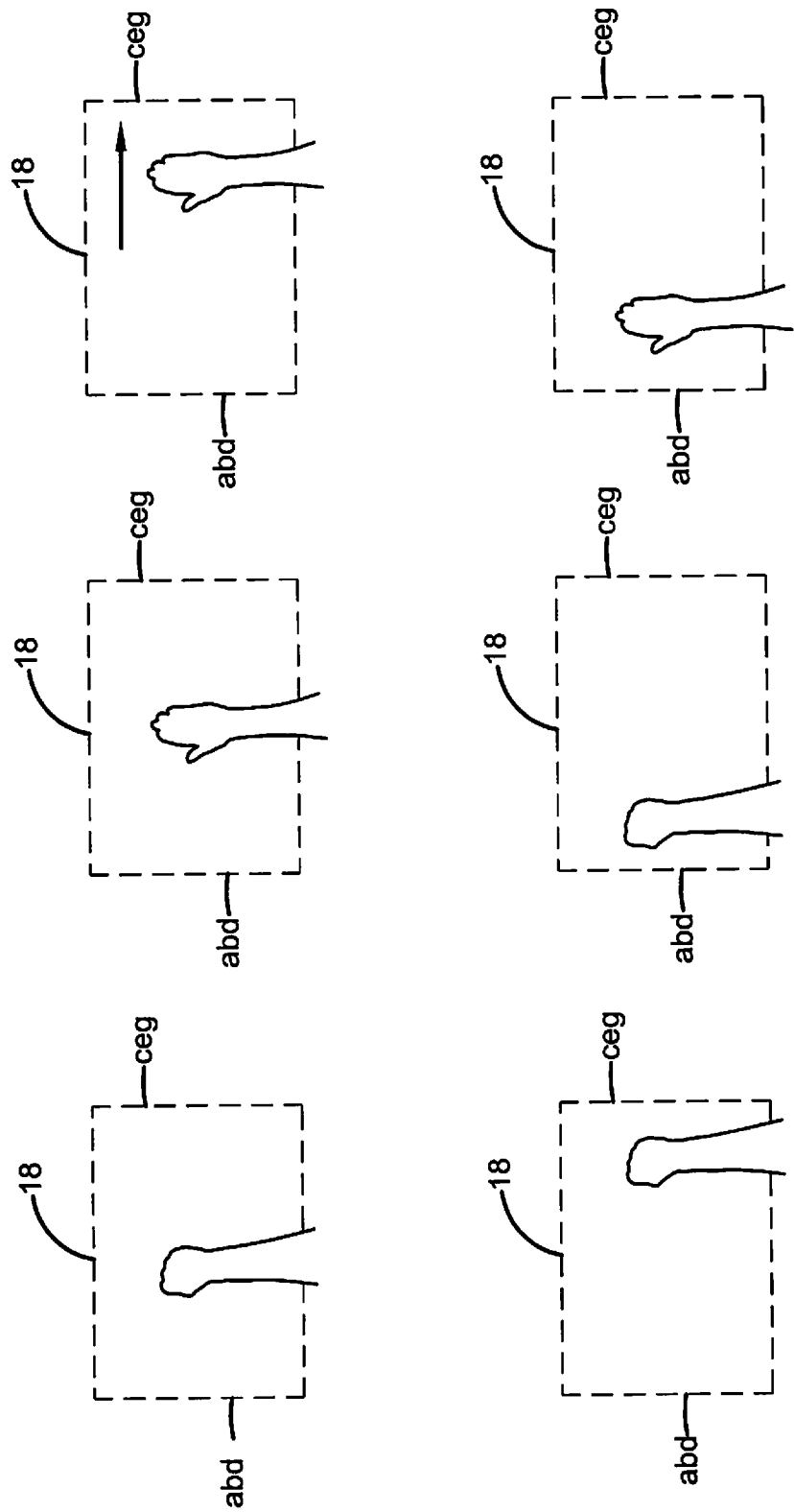
FIG. 8 is a general schematic showing the motion of a hand within a gesture controller to describe the creation of a user-defined home position within the sensing field of the controller.

Referring now to FIG. 8, a gesture controller for facilitating the manipulation of an object t, t' is shown by representing in different frames the movement of an operator's hand within a sensing field 18'. Because a top plan view is employed, the box-like structure of the sensing field is not seen, and is not necessary to understand the concepts disclosed. The intent is to provide the operator with the ability create a new home position for object manipulations. Although a hand is shown as the item forming the gesture, any appendage or body part or even other physical devices, machines or robots might be employed to execute the gestures necessary to cause desired actions. It will be appreciated that the sensing field area/volume is limited, and executing a gesture to perform a particular action may be facilitated by programming the gesture controllers to create a new home position upon detection of what is herein called a home gesture.

In FIG. 8, a hand gesture is employed for moving an object and defining the direction and speed at which the motion of the object occurs. A home gesture is also employed, including, by way of example only, the opening and closing a hand. It will be appreciated that any distinct gesture or gestures could be used as a home gesture. The top plan view is a simplification of the sensing field 18. Here the 2D space is shown with closed hand 40 in the sensing field 18. The figure represents only control of motion left and right (x direction) but it can be appreciated that in a sensing field the motion may be in any direction. For purpose of this example, a closed hand would be placed into the sensing field 18, with the closed hand being sensed and causing a prevention of motion control. In some embodiments, the act of placing the hand in the sensing field turns a boundary switch on to allow movement, with the closed hand gesture prohibits movement. When the hand is opened, two functions occur: 1) a "home" position within the field is defined (represented by the arrow in the first frame) and 2) motion control is allowed. In the home position no motion occurs. In the example of FIG. 8, as the open hand is moved to the left, the object would move to the left. In some embodiments, the system would be programmed such that the further that the open hand moves to the left of the field (or left of the established home position), the faster the object will move to the left. In other embodiments, a constant rate of motion might be effected regardless of the magnitude of movement from the home position. This will be based on the needs of a given application and suitability of providing or prohibiting such speed control.

It can be appreciated that movement of the hand is limited by the boundaries of the sensing area, and different movement systems might benefit from the ability to create a home position. If the object is moved from its current position only when the hand moves, the distance the object can move to the right is limited by the right boundary because the operator cannot leave the boundary and still effect movement. Thus, in FIG. 8, when the hand approaches the right boundary ceg, the hand is closed, prohibiting movement. It is then moved to the left, and the hand is reopened, creating a new home position, from which the object can now be moved further to the right. This is similar to picking up and repositioning a computer mouse when running out of room or contacting an obstacle in moving the mouse a particular direction.

Thus, in some embodiments, the present invention provides a gesture control system form manipulating an object wherein a gesture controller is operatively connected to the object and structured and programmed such that the object is moved upon movement of an gesturing object in the gesture controller relative to a home position, and wherein a new home position is established in the gesture controller when a home gesture is detected by the gesture controller.

Figure 9:
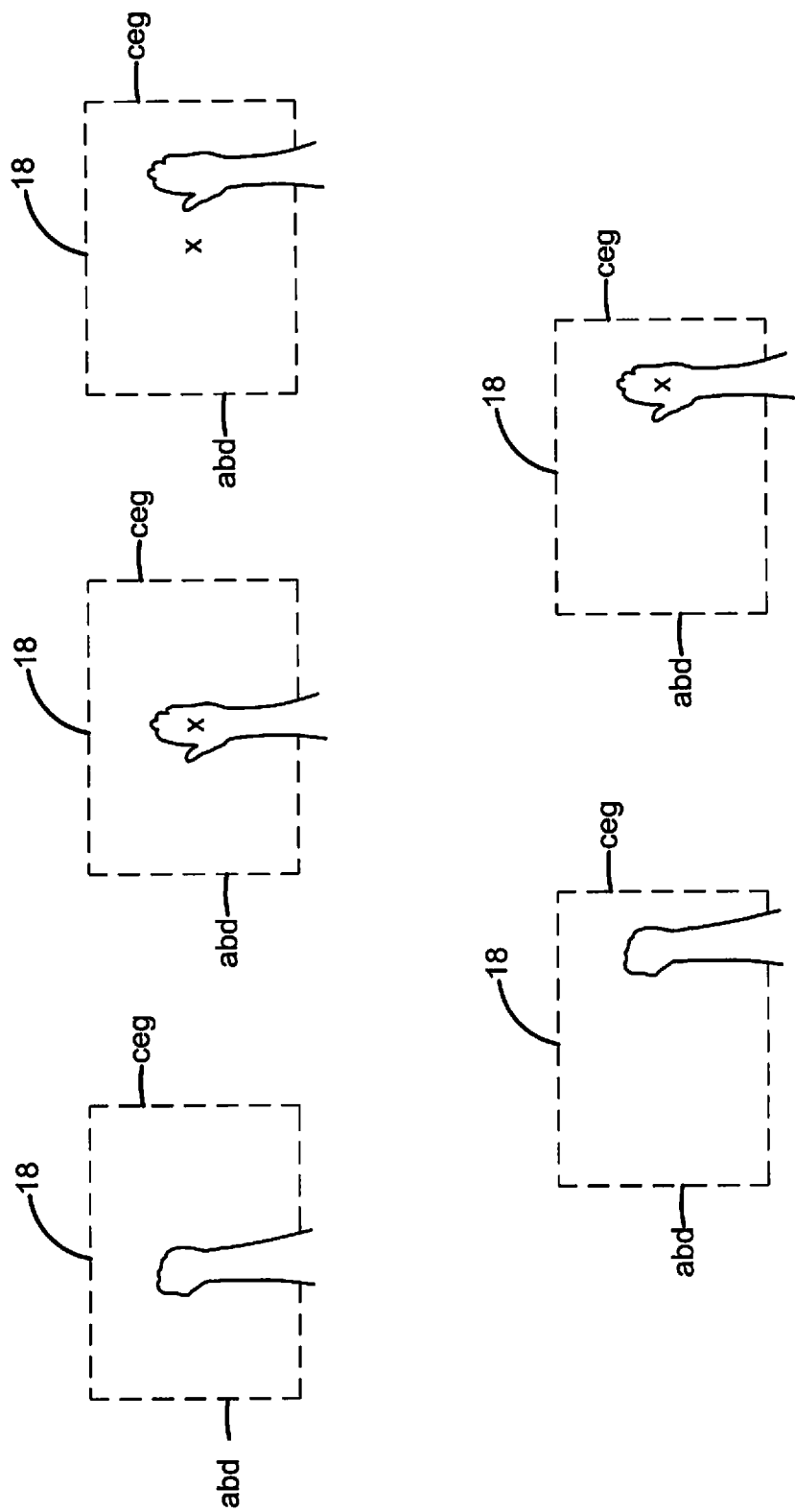
FIG. 9 is a general schematic showing the motion of a hand within a gesture controller to describe the creation of a user-defined home position within the sensing field of the controller.

In some embodiments, as seen in FIG. 9, both the position of the object and the speed at which it is moved is controlled by the hand gestures and movement of the hand in the sensing field in relation to a home position. With the hand at the home position, no movement occurs. Movement off of the home position causes movement of the object t, t' in a desired direction, with the speed of the movement being dependent on the distance of the hand from the home position. In such a movement method, the hand would have to come back to the home position and then travel in an opposite direction to thereby move the object in an opposite direction. Thus, the present invention, as shown in FIG. 9, allows the operator to make a new home position by making a gesture that causes the system to prohibit movement (e.g. closed hand), thereafter repositioning the hand and making a gesture that causes the system to allow movement (open hand). Thus, in the frames of FIG. 9, a closed hand enters the sensing field 18, with the closed hand being sensed and causing a prevention of motion control. The opening of the hand in the second frame establishes a home position (at the X shown in the second frame) and, in the home position no motion occurs. As the open hand is moved to the right, the object would move to the right. In some embodiments, the object would be moved at a constant rate despite the positioning of the hand relative to the home position, with the positioning of the hand functioning to define the direction of motion only. In other embodiments, the distance the hand moves from the home position causes a change in the speed at which the object is moved. In either embodiment, the direction and distance the object moves are dependent upon the amount of time the hand remains off the home position. To change direction, the hand could return to the left and, once it approaches and passes the home position and moves to the left thereof, the object would likewise slow and then stop its rightward motion and switch direction and move to the left. Of course, left and right motion are exemplary only, and any type of motion could be achieved through this concept. To avoid requiring a return to the home position to establish a different direction of motion and to otherwise allow more nuanced control of the object, a new home position can be created at any time through an appropriate home gesture. Here, the operator, after moving the object rightward by moving the open hand to the right and holding for the desired time, stops motion by forming a first and then creates a new home position near the right boundary ceg by opening the hand. Thereafter, movement to the left can be effected without regard to the home position initially established.

Aspects of the invention relating to transferring the active state between multiple controllers has broad application in any gesture control system employing multiple controllers. Aspects of motion as disclosed with respect to the boundary switch and the creation of new home positions for motion have application in gesture controls systems employing one or more gesture controllers.

In particular embodiments, one or more aspects of the present invention are implemented in a microscopy assembly having a microscope and a specimen on translation stage. A translation stage serves to move the specimen under the microscope to change the portion of the specimen that is imaged thereby. The movement can be in x, y and/or z directions. In some embodiments, the specimen and/or portions of the microscope can be manipulated to image the desired portion. The microscope could be movable relative to the specimen or a combination of movement of the microscope and movement of the specimen could be practiced. General aspects of using gesture controls to in microscopy are shown in patent DE 102012220195.

In light of the foregoing, it should be appreciated that the present invention significantly advances the art of gesture control systems. While particular embodiments of the invention have been disclosed in detail herein, it should be appreciated that the invention is not limited to or by and specific example and as variations on the invention herein will be readily appreciated by those of ordinary skill in the art. The scope of the invention shall be appreciated from the claims that follow.

The invention claimed is:

1. A computer-implemented method, comprising:
   receiving, by a computing system from a first gesture controller of a set of gesture controllers, an indication of a first gesture within a sensing field of the first gesture controller;
   determining, by the computing system, an operation performable on an object corresponding to the first gesture;
   based on the determining, causing, by the computing system, the operation to be performed to the object;
   receiving, by the computing system from the first gesture controller, a second indication of a second gesture within the sensing field of the first gesture controller;
   determining, by the computing system, that the second gesture corresponds to a request to set a second gesture controller of the set of gesture controllers in an active state; and
   in response to the second gesture, setting, by the computing system, the second gesture controller in the active state, wherein, in the active state, the second gesture controller is configured to detect gestures within a second sensing field of the second gesture controller.

2. The computer-implemented method of claim 1, further comprising:
   setting, by the computing system, the first gesture controller in an inactive state, wherein the first gesture controller is prohibited from performing the operation as a result of being in the inactive state.

3. The computer-implemented method of claim 1, further comprising:
   receiving, by the computing system from the first gesture controller, a third indication corresponding to an acquire gesture corresponding to a request to acquire the active state from the second gesture controller; and
   in response to the acquire gesture, transferring, by the computing system, the active state from the second gesture controller to the first gesture controller.

4. The computer-implemented method of claim 1, further comprising:
   receiving, by the computing system from the first gesture controller, a third indication corresponding to a pause gesture; and
   in response to the pause gesture, setting, by the computing system, the set of gesture controllers to an inactive state.

5. The computer-implemented method of claim 1, wherein the object is a physical object coupled with the computing system.

6. The computer-implemented method of claim 1, wherein the object is a virtual object controllable by the computing system.

7. The computer-implemented method of claim 1, wherein setting, by the computing system, the second gesture controller in the active state comprises:
   receiving, by the computing system from the second gesture controller, an indication of an acceptance gesture within the second sensing field of the second gesture controller; and
   based on the acceptance gesture, authorizing, by the computing system, the second gesture controller to assume the active state.

8. The computer-implemented method of claim 1, wherein receiving, by the computing system from the first gesture controller, the second indication of the second gesture within the sensing field of the first gesture controller comprises:
   detecting a portion of a user within the sensing field throughout a duration of the second gesture.

9. A computing system, comprising:
   one or more processors in communication with a set of gesture controllers comprising a first gesture controller and a second gesture controller; and
   a memory having programming instructions stored thereon, which, when executed by the one or more processors, cause the computing system to perform operations comprising:
      receiving, from the first gesture controller, an indication of a first gesture within a sensing field of the first gesture controller;
      determining an operation performable on an object corresponding to the first gesture;
      based on the determining, causing the operation to be performed to the object;
      receiving, from the first gesture controller, a second indication of a second gesture within the sensing field of the first gesture controller;
      determining that the second gesture corresponds to a request to set the second gesture controller to an active state; and
      in response to the second gesture, setting the second gesture controller to the active state, wherein, in the active state, the second gesture controller is configured to detect gestures within a second sensing field of the second gesture controller.

10. The computing system of claim 9, wherein the operations further comprise:
setting the first gesture controller in an inactive state, wherein the first gesture controller is prohibited from performing the operation as a result of being in the inactive state.

11. The computing system of claim 9, wherein the operations further comprise:
receiving, from the first gesture controller, a third indication corresponding to an acquire gesture corresponding to a request to acquire the active state from the second gesture controller; and
in response to the acquire gesture, transferring the active state from the second gesture controller to the first gesture controller.

12. The computing system of claim 9, wherein the operations further comprise:
receiving, from the first gesture controller, a third indication corresponding to a pause gesture; and
in response to the pause gesture, setting the set of gesture controllers to an inactive state.

13. The computing system of claim 9, wherein the object is a physical object coupled with the computing system.

14. The computing system of claim 9, wherein the object is a virtual object controllable by the computing system.

15. The computing system of claim 9, wherein setting the second gesture controller in the active state comprises:
receiving, from the second gesture controller, an indication of an acceptance gesture within the second sensing field of the second gesture controller; and
based on the acceptance gesture, authorizing the second gesture controller to assume the active state.

16. A non-transitory computer readable medium storing thereon executable instructions that, as a result of being executed by a computer system, cause the computer system to perform operations comprising:
receiving, by a computing system from a first gesture controller of a set of gesture controllers, an indication of a first gesture within a sensing field of the first gesture controller;
determining, by the computing system, an operation performable on an object corresponding to the first gesture;
based on the determining, causing, by the computing system, the operation to be performed to the object;
receiving, by the computing system from the first gesture controller, a second indication of a second gesture within the sensing field of the first gesture controller;
determining, by the computing system, that the second gesture corresponds to a request to set a second gesture controller of the set of gesture controllers to an active state; and
in response to the second gesture, setting, by the computing system, the second gesture controller to the active state, wherein, in the active state, the second gesture controller is configured to detect gestures within a second sensing field of the second gesture controller.

17. The non-transitory computer readable medium of claim 16, further comprising:
setting, by the computing system, the first gesture controller in an inactive state, wherein the first gesture controller is prohibited from performing the operation as a result of being in the inactive state.

18. The non-transitory computer readable medium of claim 16, further comprising:
receiving, by the computing system from the first gesture controller, a third indication corresponding to an acquire gesture corresponding to a request to acquire the active state from the second gesture controller; and
in response to the acquire gesture, transferring, by the computing system, the active state from the second gesture controller to the first gesture controller.

19. The non-transitory computer readable medium of claim 16, further comprising:
receiving, by the computing system from the first gesture controller, a third indication corresponding to a pause gesture; and
in response to the pause gesture, setting, by the computing system, the set of gesture controllers to an inactive state.

20. The non-transitory computer readable medium of claim 16, wherein the object is a physical object coupled with the computing system or a virtual object controllable by the computing system.

* * * * *